United States Patent [19]

Shindow et al.

[11] Patent Number: 4,490,417
[45] Date of Patent: Dec. 25, 1984

[54] COATING COMPOSITION

[75] Inventors: Kenji Shindow; Akimitsu Uenaka; Takaharu Izumo; Teruyoshi Fujishima; Satoshi Yamamoto, all of Neyagawa, Japan

[73] Assignee: Nippon Paint Co., Ltd., Osaka, Japan

[21] Appl. No.: 495,731

[22] Filed: May 20, 1983

Related U.S. Application Data

[63] Continuation of Ser. No. 297,974, Aug. 31, 1981, abandoned.

[30] Foreign Application Priority Data

Aug. 29, 1980 [JP] Japan ................... 55-120484

[51] Int. Cl.$^3$ .................. B05D 3/02; C08L 61/28
[52] U.S. Cl. ................... 427/388.3; 427/327; 427/385.5; 427/407.1; 427/409; 428/460; 428/502; 524/100; 524/512; 525/162; 525/163
[58] Field of Search ............... 525/162, 163; 427/385.5, 407.1, 409, 327, 388.3; 428/460, 463; 524/100, 512

[56] References Cited

U.S. PATENT DOCUMENTS

| | | | |
|---|---|---|---|
| 4,055,607 | 10/1977 | Sullivan et al. | 525/162 |
| 4,221,683 | 9/1980 | Nakate et al. | 525/162 |
| 4,226,901 | 10/1980 | Sugiura et al. | 525/162 |
| 4,291,130 | 9/1981 | Saunders | 525/162 |
| 4,297,448 | 10/1981 | Chang et al. | 525/162 |

*Primary Examiner*—Theodore E. Pertilla
*Attorney, Agent, or Firm*—Wenderoth, Lind & Ponack

[57] ABSTRACT

A coating composition which comprises (A) a vinylic monomer-copolymerized resin having a hydroxyl group and a carboxyl group and (B) an alkoxylated amine-formaldehyde condensate as a curing agent for the resin (A). When the coating composition is used as a base coating composition and/or as a clear coating composition in the two coat-one bake coating system, the resulting coating film shows excellent weather resistance with good appearance.

19 Claims, No Drawings

COATING COMPOSITION

This application is a continuation of now abandoned Ser. No. 297,974 filed Aug. 31, 1981.

The present invention relates to a coating composition. More particularly, it relates to a coating composition excellent in weather resistance.

There is known a coating procedure wherein a coating composition is first applied onto a substrate and, without baking, another coating composition is applied thereon, followed by baking, and such procedure is called "two coat-one bake coating system". Since the two coat-one bake coating system can generally provide coating films having excellent appearance and quality, it is widely used to make top-coating for vehicles such as automobile bodies.

In recent years, coating films are required to have not only excellent appearance and quality but also high resistance to weather. In order to meet such requirements, some proposals have been made. For enhancing the appearance and quality of coating films, the drying property of a coating composition to be used for base coating (i.e. first coating) is increased, and a cellulose ester is incorporated into such coating composition in order to prevent its mixing with another coating composition to be used for clear coating (i.e. second coating) at the interface between the base coating and the clear coating (Japanese Patent Publication (examined) No. 38005/1974). In place of the incorporation of a cellulose ester, the solubility parameter of the solvent for the clear coating composition may be lowered (Japanese Patent Publication (examined) No. 35580/1978). For increasing the weather resistance of coating films, the clear coating composition may be incorporated with a compound having an absorptive property of ultraviolet rays, a resin obtainable by polymerization of a compound comprising a group having an absorptive property of ultraviolet rays, an oxidation inhibitor or a photo-stabilizer.

As a result of the extensive study, it has now been found that a coating film formed by the use of a coating composition comprising (A) a vinylic monomer-copolymerized resin having a hydroxyl group and a carboxyl group and (B) an alkoxylated amine-formaldehyde condensate as a curing agent for the resin (A) shows high resistance to weather with good appearance. Particularly when such coating composition is used as a base coating composition and/or a clear coating composition in the two coat-one bake coating system, excellent weather resistance is produced. In general, the coating films formed by the coating compositions for the two coat-one bake coating system are apt to produce cracks and peeling as the abnormality due to weather, but the use of the above coating composition markedly inhibits the production of cracks and peeling.

The coating composition of the present invention comprises (A) a vinylic monomer-copolymerized resin having a hydroxyl group and a carboxyl group and (B) an alkoxyated amine-formaldehyde condensate as a curing agent for the resin (A).

The vinylic monomer-copolymerized resin (A) may be produced by polymerization of (1) an ethylenically unsaturated monomer having a hydroxyl group, (2) an ethylenically unsaturated monomer having a carboxyl group and optionally (3) at least one other ethylenically unsaturated monomer copolymerizable therewith in the presence of a polymerization catalyst according to a perse conventional procedure. The mode of polymerization may be solution polymerization, emulsion polymerization, suspension polymerization, bulk polymerization or the like.

Examples of the hydroxyl group-containing ethylenically unsaturated monomer (1) are hydroxyethyl acrylate, hydroxypropyl acrylate, hydroxybutyl acrylate, hydroxymethyl methacrylate, hydroxyethyl methacrylate, hydroxypropyl methacrylate, hydroxybutyl methacrylate, N-methylolacrylamide, allyl alcohol, etc. Examples of the carboxyl group-containing ethylenically unsaturated monomer (2) are acrylic acid, methacrylic acid, crotonic acid, ethacrylic acid, propylacrylic acid, isopropylacrylic acid, itaconic acid, maleic anhydride, fumaric acid, etc. Examples of the other monomer (3) are alkyl acrylates (e.g. methyl acrylate, ethyl acrylate, isopropyl acrylate, n-propyl acrylate, n-butyl acrylate, isobutyl acrylate, 2-ethylhexyl acrylate, n-octylacrylate, dodecyl acrylate, lauryl acrylate), alkyl methacrylates (e.g. methyl methacrylate, ethyl methacrylate, isopropyl methacrylate, n-propyl methacrylate, n-butyl methacrylate, isobutyl methacrylate, 2-ethylhexyl methacrylate, n-octyl methacrylate, dodecyl methacrylate, lauryl methacrylate, stearyl methacrylate, tridecyl methacrylate), addition products of fatty acids with oxirane structure-containing acrylates or methacrylates (e.g. addition product of stearic acid with glycidyl methacrylate), addition products of oxirane compounds containing an alkyl group of not less than 8 carbon atoms with acrylic acid or methacrylic acid (cf. Japanese Pat Nos. 583,185 and 609,322), styrene, α-methylstyrene, o-methylstyrene, m-methylstyrene, p-methylstyrene, p-tert-butylstyrene, benzyl acrylate, benzyl methacrylate, itaconates (e.g. dimethyl itaconate), maleates (e.g. dimethyl maleate), fumarates (e.g. dimethyl fumarate), acrylonitrile, methacrylonitrile, vinyl acetate, etc.

As the alkoxylated amine-formaldehyde condensate (B), there may be used the alkyl etherified products of the reaction products between amines such as urea, diethyleneurea, dicyandiamide, melamine and benzoguanamine and aldehydes such as formaldehyde and paraformaldehyde. Specific examples are methoxylated methylolurea, methoxylated methyloldiethyleneurea, methoxylated methyloldicyandiamide, methoxylated methylolmelamine, methoxylated methylolbenzoguanamine, isobutoxylated methylolmelamine, butoxylated methylolurea, butoxylated methyloldiethyleneurea, butoxylated methyloldicyandiamide, butoxylated methylolmelamine, butoxylated methylolbenzoguanamine, etc. There may be also used butoxylated methylolurea-melamine condensate, butoxylated methylolmelamine-benzoguanamine condensate, etc.

The mixing proportion of the components (A) and (B) in the coating composition of the invention is preferred to be from 9:1 to 6:4 by weight (in terms of the solid components).

When the coating composition of the invention comprises additionally (C) a compound comprising no reactive group, having a number average molecular weight of 300 to 5,000 and being in a non-crystalline state at room temperature, the curing rate is highly increased, and the cross-linking density in the coating film resulting from such composition is enhanced with decrease of the concentration of the unreacted functional group in the coating film. Thus, the water absorption and the water permeability of the coating film are lowered, and the water resistance of the coating film is improved.

The additional inclusion of (D) a piperidine compound of the formula:

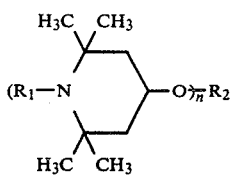

wherein n is an integer of 1 to 3, $R_1$ is hydrogen or alkyl and $R_2$ is monoacyl, N-substituted carbamoyl, N-substituted thiocarbamoyl, a monovalent group derived from an oxygen acid excluding one hydroxyl therefrom, alkyl, cycloalkyl, aralkyl or aryl when n is 1, diacyl, dicarbamoyl, bisthiocarbamoyl, carbonyl, a divalent group derived from an oxygen acid excluding two hydroxyls therefrom, alkylene, arylene or arylenedialkyl when n is 2 or triacyl, tricarbamoyl, tristhiocarbamoyl, a trivalent group derived from an oxygen acid excluding three hydroxyls therefrom, alkanetriyl, arenetriyl or arenetriylalkylene, in the coating composition of the invention produces a synergistic effect in improvement of the water resistance.

As the compound (C), there may be used any one chosen from the following groups:

(a) Phthalates and adipates: dibutyl phthalate, dioctyl phthalate, diisononyl phthalate, diisodecyl phthalate, dioctyl adipate, etc.

(b) Epoxy compounds: epoxylated soybean, epoxylated linseed oil ("ADK Cizer O-130P", "ADK Cizer O-180" manufactured by Adeca-Argus Chemical Co., Ltd.; "Epocizer W-100EL", "Epocizer W-109EL" manufactured by Dainippon Ink K.K.), epoxylated fatty acid ester ("Epocizer W-180", "Epocizer W-121", "Epocizer W-128", "Epocizer W-131" manufactured by Dainippon Ink K.K.), etc.

(c) Polyesters: sebacate polyesters ("Polycizer P-202" manufactured by Dainippon Ink K.K.), adipate polyesters ("Polycizer P-204N", "Polycizer W-300", "Polycizer W-305", "Polycizer W-305EL", "Polycizer P-103", "Polycizer P-103EL-S", "Polycizer W-320" manufactured by Dainippon Ink K.K.; "ADK Cizer PN-150", "ADK Cizer PN-220", "ADK Cizer PN-250", "ADK Cizer PN-280", "ADK Cizer PN-350", "ADK Cizer PN-400", "ADK Cizer PN-260", "ADK Cizer PN-310" manufactured by Adeca-Argus Chemical Co., Ltd.), etc.

(d) Trimellitates: trimellitate polyesters ("Monocizer W-700", "Monocizer W-710", "Monocizer W-750", "Monocizer W-705", "Monocizer W-715" manufactured by Dainkppon Ink K.K.; "ADK Cizer C-10" manufactured by Adeca-Argus Chemical Co., Ltd.), etc.

(e) Chlorinated compounds: chlorinated n-paraffin ("Monocizer W-45", "Monocizer W-50" manufactured by Dainippon Ink K.K.; "ADK Cizer E-410", "ADK Cizer E-450", "ADK Cizer E-500" manufactured by Adeca-Argus Chemical Co., Ltd.), chlorinated paraffin ("Monocizer W-40" manufactured by Dainippon Ink K.K.), chlorinated fatty acid esters ("Monocizer W-403", "Monocizer W-430", "Monocizer W-410", "Monocizer W-410EL", "Monocizer W-450" manufactured by Dainippon Ink K.K.), etc.

(f) Others: Dipentaerythritol esters, etc.

Examples of the piperidine compound (D) are bis(2,2,6,6-tetramethyl-4-piperidyl)carbonate, bis(2,2,6,6-tetramethyl-4-piperidyl)malonate, bis(2,2,6,6-tetramethyl-4-piperidyl)sebacate, bis(2,2,6,6-tetramethyl-4-piperidyl)terephthalate, $\alpha,\alpha'$-bis(2,2,6,6-tetramethyl-4-piperidyloxy)p-xylene, bis(2,2,6,6-tetramethyl-4-piperidyl)tolylene-2,4-dicarbamate, bis(2,2,6,6-tetramethyl-4-piperidyl)diphenylmethane-p,p'-dicarbamate, bis(2,2,6,6-tetramethyl-4-piperidyl)benzene-1,3-disulfonate, bis(2,2,6,6-tetramethyl-4-piperidyl)phenylphosphite, bis(1,2,2,6,6-pentamethyl-4-piperidyl)sebacate, etc.

The amount of the compound (C) to be used may be from 0.1 to 5 parts by weight, preferably from 0.5 to 4 parts by weight, to 100 parts by weight of the total amount of the components (A) and (B) (in terms of the solid components). When the amount is less than the lower limit, the desired enhancement of the curing rate can not be attained. When the amount is more than the higher limit, the concentration of the functional group in the system is decreased, and the curing rate is lowered.

The amount of the piperidine compound (D) may be from 0.05 to 3 parts by weight, preferably from 0.1 to 2 parts by weight, to 100 parts by weight of the total amount of the components (A) and (B) (in terms of the solid components). When the amount is less than the lower limit, the desired improvement of weather resistance is not achieved. Even if the amount is increased more than the higher limit, any further improvement is not produced.

In addition to the components (A) and (B) optionally with the components (C) and/or (D), the coating composition of the invention may comprise conventional additives depending on its use. Examples of such additives are solvents, metal powders (e.g. aluminum powders), coloring agents such as pigments and dyestuffs, fillers, surface regulators such as silicon resins, acrylic resins, ultraviolet ray absorbers, etc. As the coloring agents, there may be employed conventional pigments or dyestuffs for coating compositions. Specific examples are metal powders, metal oxides, metal hydroxides, metal sulfides, sulfates, carbonates, chromates, carbon black, organic pigments, organic dyestuffs, etc. Fillers such as silica and talc are also usable.

As stated above, the coating composition of this invention can be advantageously used, particularly in the two coat-one bake coating system.

On the use for the two coat-one bake coating system, the base coating composition is preferred to employ, as the component (A), (A') a vinylic monomer-copolymerized resin prepared by polymerization of (1) an ethylenically unsaturated monomer having a hydroxyl group, (2) an ethylenically unsaturated monomer having a carboxyl group and optionally (3) at least one other ethylenically unsaturated monomer copolymerizable with them, the monomer (1) being used in an amount which can provide the produced solid resin with a hydroxyl value of 40 to 80 and the monomer (2) being used in an amount which can provide the produced solid resin with an acid value of 5 to 25, and having a glass transition temperature of 20° to 50° C. and a solubility parameter of 10.3 to 11.5. As the component (B), the use of (B') an alkoxylated melamine-formaldehyde condensate is preferred.

When the resin (A') has a hydroxyl value of less than 40, the crosslinking density of the coating film is low, and its water resistance is poor. When the hydroxyl value is more than 80, the increase of the water-philic group due to hydrolysis is rapid, and the water resistance is bad. In case of the resin (A') having an acid value of less than 5, the curing of the coating film is insufficient, and its water resistance is low. In case of the acid value being more than 25, the coating film is apt to be hydrolyzed, and its water resistance is poor. When the glass transition temperature is lower than 20° C., water is readily diffused into the coating film, whereby the peeling of the coating film tends to occur. When the glass transition temperature is higher than 50° C., the degree of extensibility of the coating film is lowered so that the production of cracks at the clear coating film is promoted. In the case that the solubility parameter is less than 10.3, the mixing with the clear coating composition takes place, and the finishing appearance of the coating film is deteriorated. In the case that the solubility parameter is more than 11.5, the water resistance of the coating film becomes inferior, and thus the water resistance is deteriorated.

Still, the glass transition temperature can be determined by the formula:

$$1/T_g = \Sigma W_n/T_{gn}$$

wherein $T_g$ is the glass transition temperature of the copolymer, $W_n$ is the weight fraction of n monomer and $T_{gn}$ is the glass transition temperature of the homopolymer of n monomer (Fox: Bull. Am. Phys. Soc., Vol. 1, No. 3, page 123 (1956)). The glass transition temperatures of various homopolymers are known and described, for instance, in "Handbook for Highpolymer Materials (Kobunshi Zairyo Binran (in Japanese))", pages 1275–1283 (1973).

Further, the solubility parameter ($\delta_{sp}$) can be calculated according to the following formula:

$$\delta_{sp} = (\sqrt{V_{ml}} \cdot \delta_{ml} + \sqrt{V_{mh}} \cdot \delta_{mh})/(\sqrt{V_{ml}} + \sqrt{V_{mh}})$$

wherein ml is the solvent of lower sp, mh is the solvent of higher sp, $\delta$ is the solubility parameter and V is the molar volume at the turbidity point (Suh et al.: J. Applied Polymer Science, Vol. 12, page 2359 (1968)).

In the said base coating composition, the weight proportion of the components (A') and (B') may be from 85:15 to 60:40 (in terms of the solid components). When the amount of the component (B') is smaller than the lower limit, the crosslinking density in the coating film is not increased. When the amount of the component (B') is larger than the upper limit, the coating film is apt to be hydrolyzed, and the finishing appearance is deteriorated. For achievement of a metallic finishing, metal powders may be incorporated into the base coating composition.

The clear coating composition in the two coat-one bake coating system is favored to comprise, as the component (A), (A") a vinylic monomer-copolymerized resin prepared by polymerizing (4) at least one of aromatic vinyl monomers and alkyl acrylates or methacrylates wherein the alkyl moiety has not less than 8 carbon atoms, (1) an ethylenically unsaturated monomer having a hydroxyl group, (2) an ethylenically unsaturated monomer having a carboxyl group and optionally (3') at least one other ethylenically unsaturated monomer copolymerizable with them, the monomer (4) being used in an amount of from 40 to 80% by weight based on the total weight of the monomers (1), (2), (3') and (4), the monomer (1) being used in an amount which can provide the produced solid resin with a hydroxyl value of 50 to 90, the monomer (2) being used in an amount which can provide the produced solid resin with an acid value of 5 to 25 and the monomer (3') being used in an amount of not more than 50% by weight based on the total weight of the monomers (1), (2), (3') and (4), and having a glass transition temperature of 10° to 45° C. As the component (B), the alkoxylated melamineformaldehyde condensate (B') may be used.

Examples of the monomer (4) are aromatic vinyl monomers such as styrene, α-methylstyrene, o-methylstyrene, m-methylstyrene, p-methylstyrene, p-tert-butylstyrene, benzyl acrylate and benzyl methacrylate, alkyl acrylates and methacrylates such as 2-ethylhexyl acrylate, n-octyl acrylate, dodecyl acrylate, lauryl acrylate, 2-ethylhexyl methacrylate, n-octyl methacrylate, dodecyl methacrylate, lauryl methacrylate, stearyl methacrylate and tridecyl methacrylate, addition products of fatty acids with oxirane structure-containing acrylates and methacrylates such as addition product of stearic acid with glycidyl methacrylate, addition products of oxirane compounds having not less than 8 carbon atoms with acrylic acid or methacrylic acid (cf. Japanese patents 583,185 and 609,322). In general, the monomer (4) is favored to be used in an amount of 60 to 80% by weight.

When the monomer (4) is used less than 40% by weight on the total weight of the entire monomers, the water absorption of the coating film as well as the water diffusion into the coating film becomes large. When the amount is more than 80% by weight, the polymerizability is lowered so that the polymer having an even composition is hardly produced, and the film properties are deteriorated. Preferably, the monomer (4) may be a mixture of styrene and alkyl acrylates or methacrylates wherein the alkyl moiety has not less than 8 carbon atoms in a weight proportion of 3–6:6–13.

The resin (A") has a hydroxyl value of 50 to 90, preferably of 60 to 80. When it is less than 50, the cross-linking density of the coating film is low, and its water resistance is poor. When it is more than 90, the increase of water-philic groups due to hydrolysis is remarkable, and the water resistance is deteriorated. In case of the resin (A") having an acid value of less than 5, the curing of the coating film is insufficient, and its water resistance is low. In case of the acid value being more than 25, the coating film is apt to be hydrolyzed, and its water resistance is poor. When the amount of the monomer (3') is increased more than 50% by weight, the balance between the glass transition temperature and the water resistance may be destroyed. When the glass transition temperature of the resin (A") is lower than 10° C., the diffusion of water into the coating film is easy so that the luster of the coating film is lowered, and peeling may be produced with facility. When it is over 45° C., the degree of extensibility of the coating film becomes lower, and cracks may be produced.

In the said clear coating composition, the weight proportion of the components (A") and (B') may be from 80:20 to 60:40 (in terms of the solid components). When the amount of the component (B') is less than the lower limit, the crosslinking density in the coating film is not increased. When more than the higher limit, the coating film will become sensitive to hydrolysis.

In order to have a satisfactory weather resistance, at least one of the base coating composition and the clear coating composition, particularly the clear coating composition, is favorable to comprise additionally the components (C) and (D).

Application of the base coating composition and the clear coating composition onto a substrate may be effected by a per se conventional procedure. In the two coat-one bake coating system, for instance, the base coating composition optionally diluted with an appropriate solvent to a desired concentration is first applied onto a substrate by spraying to make a film thickness of about 20μ. After setting for about 3 minutes, the clear coating composition optionally diluted with a suitable solvent to a desired concentration is applied thereon by spraying to make a film thickness of about 30μ. After setting for about 5 minutes, the coated substrate is subjected to baking at a certain temperature for a desired period of time.

The thus formed coating film has good appearance and is excellent in various performances, particularly in weather resistance.

Practical and presently preferred embodiments of the present invention will be shown in the following Examples wherein part(s) and % are by weight.

EXAMPLE 1

Preparation of a base coating composition:
Component (A):

Into a 2 liter volume flask equipped with a reflux cooler, a dropping funnel, a thermometer and an agitator, xylene (320 g), n-butanol (80 g), methyl methacrylate (400 g), n-butyl acrylate (264 g), 2-hydroxyethyl methacrylate (120 g) and methacrylic acid (16 g) were charged, and the resultant mixture was heated up to 110° C. A mixture of xylene (320 g), n-butanol (80 g), azobisisobutyronitrile (8 g) and laurylmercaptan (2 g) was dropwise added thereto in 3 hours. After the dropwise addition was completed, the resultant mixture was agitated at about 110° C. for 2 hours to give a resinous composition (solid content, 50%).

Component (B):
n-Butoxylated methylolmelamine ("Uban 20SE60" manufactured by Mitsui Toatsu Co., Ltd.; solid content, 60%).

The component (A) (140 parts), the component (B) (50 parts), an aluminum pigment ("Alpaste No. 1123N" manufactured by Toyo Aluminum Co., Ltd.) (22 parts) and xylene (30 parts) were mixed together. The resultant mixture (242 parts) was diluted with a mixture of toluene, isobutanol and ethylene glycol monoethyl acetate (60:20:20 by weight) to make a base coating composition showing a value of 13 seconds (20° C.) with No. 4 Ford Cup.

EXAMPLE 2

Preparation of a clear coating composition:
Component (A″):

Into a 2 liter volume flask equipped with a reflux cooler, a dropping funnel, a thermometer and an agitator, xylene (440 g) and n-butanol (160 g) were charged, and the resultant mixture was heated up to 120° C. A mixture of styrene (240 g), 2-ethylhexyl methacrylate (160 g), methyl methacrylate (85.6 g), n-butyl methacrylate (76.8 g), n-butyl acrylate (120 g), hydroxyethyl methacrylate (111.2 g), methacrylic acid (6.4 g) and azobisisobutyronitrile (16 g) was dropwise added thereto in 3 hours. After aging for 30 minutes, a mixture of xylene (50 parts) and benzoyl peroxide (1 g) was dropwise added thereto. Then, the resultant mixture was aged for 2 hours and diluted with xylene (150 parts) to give a resinous composition (solid content, 50%).

In the same procedure as above but using the monomeric composition as shown in Table 1, there was prepared a resinous composition as the component (A″).

TABLE 1

| Run No. | Monomers (part(s)) | | | | | | | | Resin characteristics | | |
|---|---|---|---|---|---|---|---|---|---|---|---|
| | ST | EHMA | EHA | MMA | nBMA | nBA | HEMA | MAA | OH value | Acid value | Tg (°C.) |
| 1 | 30 | 20 | — | 10.7 | 9.6 | 15.0 | 13.9 | 0.8 | 60 | 5 | 30 |
| 2 | 30 | 20 | — | 10.0 | 10.1 | 14.5 | 13.9 | 1.5 | 60 | 10 | 30 |
| 3 | 30 | 20 | — | 8.4 | 11.6 | 13.0 | 13.9 | 3.1 | 60 | 20 | 30 |
| 4 | 30 | 20 | — | 7.7 | 7.8 | 14.5 | 18.5 | 1.5 | 80 | 10 | 30 |
| 5 | 30 | 40 | — | 10.0 | 4.6 | — | 13.9 | 1.5 | 60 | 10 | 30 |
| 6 | 30 | 20 | — | 6.5 | 28.1 | — | 13.9 | 1.5 | 60 | 10 | 15 |
| 7 | 25 | 20 | — | 11.5 | 28.1 | — | 13.9 | 1.5 | 60 | 10 | 15 |
| 8 | 35 | 20 | — | 5.0 | 28.1 | — | 13.9 | 1.5 | 60 | 10 | 15 |
| 9 | 30 | 20 | — | 10.0 | 18.0 | 6.6 | 13.9 | 1.5 | 60 | 10 | 40 |
| 10 | — | 45 | 5 | 34.6 | — | — | 13.9 | 1.5 | 60 | 10 | 27 |
| 11 | 15 | 30 | 5 | 17 | 17.6 | — | 13.9 | 1.5 | 60 | 10 | 30 |
| 12 | 45 | 5 | — | 7 | — | 27.6 | 13.9 | 1.5 | 60 | 10 | 30 |
| 13 | 30 | 20 | — | 11.2 | 10 | 14.6 | 13.9 | 0.3 | 60 | 2 | 30 |
| 14 | 30 | 20 | — | 6.9 | 8.1 | 16.5 | 13.9 | 4.6 | 60 | 30 | 30 |
| 15 | 30 | 20 | — | 12.3 | 11.6 | 15.3 | 9.3 | 1.5 | 40 | 10 | 30 |
| 16 | 30 | 20 | — | 5.5 | 4.8 | 15 | 23.2 | 1.5 | 100 | 10 | 30 |
| 17 | 30 | — | — | — | 39.3 | 15.3 | 13.9 | 1.5 | 60 | 10 | 30 |
| 18 | 30 | 55.6 | — | — | — | — | 13.9 | 1.5 | 60 | 10 | 26 |
| 19 | 30 | 20 | — | — | — | 34.6 | 13.9 | 1.5 | 60 | 10 | 5 |
| 20 | 30 | 20 | — | 15 | 19.6 | — | 13.9 | 1.5 | 60 | 10 | 50 |
| 21 | 30 | 20 | — | 34.6 | — | — | 13.9 | 1.5 | 60 | 10 | 68 |

In the above table, the abbreviations have the following meanings: ST, sytrene; EHMA, 2-ethylhexyl methacrylate; EHA, 2-ethylhexyl acrylate; MMA, methyl methacrylate; nBMA, n-butyl methacrylate; nBA, n-butyl acrylate; HEMA, 2-hydroxyethyl methacrylate; MAA, methacrylic acid; Tg, glass transition temperature as calculated.

Component (B′):
n-Butoxylated methylolmelamine ("Uban 20SE60" manufactured by Mitsui Toatsu Co., Ltd.).

The components (A″) and (B′) were mixed together in a weight proportion of 70:30 (in terms of the solid components), and the resultant mixture was diluted with xylene to make a clear coating composition showing a value of 25 seconds (20° C.) with No. 4 Ford Cup.

EXAMPLE 3

Two coat-one bake coating system:
Onto the steel plate obtained by degreasing and phosphating a polished mild steel plate and applying subsequently an electro-deposition coating composition and an intermediary coating composition thereto, the base coating composition prepared in Example 1 was sprayed twice with an interval of 2 minutes in a water washing booth at a temperature of 23° C. under a humidity of 85%, and after 3 minutes, the clear coating composition prepared in Example 2 was sprayed thereon so as to make a coating film having a thickness of 20μ for the base coating composition and a thickness of 30μ for the clear coating composition. Then, the coated plate was baked at 140° C. for 30 minutes to make a test piece.

The test piece was subjected to test by the use of a sunshine weatherometer (manufactured by Suga Testing Machine Mfg. Co., Ltd.) (irradiated, 600 hours) and of a wetting tester (50° C., 98% relative humidity, 96 hours) taken as one cycle, and the test was repeatedly carried out to evaluate the abnormality (e.g. cracks, peeling, luster depression) on the appearance of the coating film. The results are shown in Table 2. Evaluation of peeling was made on the state of the coating film after the test piece was taken out from the wetting tester, wiped off to eliminate the water drops attached thereon, dried at room temperature for 30 minutes and cross-cut at the surface, followed by attaching an adhesive tape and peeling off the same; O, no abnormality, X, coating film peeled off. Cracks were observed macroscopically; O, no abnormality; X, cracks produced. Evaluation of luster was effected macroscopically; O, no remarkable luster depression; X, remarkable luster depression.

the component (B') were mixed together in the weight proportion as shown in Table 3, and a clear coating composition was prepared in the same manner as in Example 2 . In the same manner as in Example 3 but using the above prepared clear coating composition, there was prepared a test piece, which was subjected to test for promoted weather resistance. The results are shown in Table 4.

TABLE 3

| Run No. | Mixing weight proportion (in terms of solid components) | |
|---|---|---|
| | Component (A″) | Component (B') |
| 22 | 80 | 20 |
| 23 | 60 | 40 |
| 24 | 90 | 10 |
| 25 | 50 | 50 |

TABLE 4

| Run No. | 2nd cycle | | | 3rd cycle | | | 4th cycle | | | 5th cycle | | |
|---|---|---|---|---|---|---|---|---|---|---|---|---|
| | Crack | Peel-ing | Luster | Crack | Peel-ing | Luster | Crack | Peel-ing | Luster | Crack | Peel-ing | Luster |
| 22 | O | O | O | O | O | O | O | O | O | X | X | X |
| 23 | O | O | O | O | O | O | O | O | O | X | X | X |
| 24 | O | O | X | X | X | X | | | | | | |
| 25 | O | O | O | X | X | X | | | | | | |

TABLE 2

| Run No. | 2nd cycle | | | 3rd cycle | | | 4th cycle | | | 5th cycle | | |
|---|---|---|---|---|---|---|---|---|---|---|---|---|
| | Crack | Peel-ing | Luster | Crack | Peel-ing | Luster | Crack | Peel-ing | Luster | Crack | Peel-ing | Luster |
| 1 | O | O | O | O | O | O | O | O | O | X | O | X |
| 2 | O | O | O | O | O | O | O | O | O | X | O | X |
| 3 | O | O | O | O | O | O | O | O | O | X | X | O |
| 4 | O | O | O | O | O | O | O | O | O | X | X | O |
| 5 | O | O | O | O | O | O | O | O | O | X | O | O |
| 6 | O | O | O | O | O | O | O | O | O | O | O | X |
| 7 | O | O | O | O | O | O | O | O | O | O | O | X |
| 8 | O | O | O | O | O | O | O | O | O | O | O | X |
| 9 | O | O | O | O | O | O | O | O | O | X | O | X |
| 10 | O | O | O | O | O | O | O | O | O | O | X | X |
| 11 | O | O | O | O | O | O | O | O | O | O | X | X |
| 12 | O | O | O | X | X | X | | | | | | |
| 13 | O | O | O | O | X | X | | | | | | |
| 14 | O | O | O | O | X | O | | | | | | |
| 15 | O | O | O | O | X | O | | | | | | |
| 16 | O | O | O | O | X | X | | | | | | |
| 17 | O | O | O | O | X | X | | | | | | |
| 18 | O | O | O | O | O | X | | | | | | |
| 19 | O | O | O | O | O | X | | | | | | |
| 20 | O | O | O | X | X | O | | | | | | |
| 21 | X | X | O | | | | | | | | | |

EXAMPLE 4

Two coat-one bake coating system:

The component (A″) (Run No. 1) prepared in Example 2 and n-butoxylated methylolmelamine ("Uban 20SE60" manufactured by Mitsui Toatsu Co., Ltd.) as

EXAMPLE 5

Preparation of a clear coating composition:

The component (A″) (Run Nos. 1 to 11) prepared in Example 2 and the component (B') were mixed together in a weight proportion of 70:30 (in terms of solid components), and epoxylated soybean oil ("Epocizer W-100EL" manufactured by Dainippon Ink K.K.) as the component (C) and bis(2,2,6,6-tetramethyl-4-piperidyl) sebacate ("Tinubin 770" manufactured by Ciba-Geigy A.G.) as the component (D) were added thereto respectively in amounts of 0.5 part and 1 part to 100 parts of the mixture of the components (A″) and (B') (in terms of the solid components). The resultant mixture was diluted with xylene to make a clear coating composition showing a value of 25 seconds (20° C.) with No. 4 Ford Cup.

EXAMPLE 6

Two coat-one bake coating system:

A test piece was prepared in the same manner as in Example 3 but using the clear coating composition prepared in Example 5 and subjected to test for promoted weather resistance. The results are shown in Table 5.

TABLE 5

| Run No. | 3rd cycle | | | 4th cycle | | | 5th cycle | | | 6th cycle | | |
|---|---|---|---|---|---|---|---|---|---|---|---|---|
| | Crack | Peeling | Luster | Crack | Peeling | Luster | Crack | Peeling | Luster | Crack | Peeling | Luster |
| 1' | O | O | O | O | O | O | O | O | O | O | O | X |
| 2' | O | O | O | O | O | O | O | O | O | O | O | O |
| 3' | O | O | O | O | O | O | O | O | O | O | O | O |
| 4' | O | O | O | O | O | O | O | O | O | O | X | O |
| 5' | O | O | O | O | O | O | O | O | O | O | O | O |
| 6' | O | O | O | O | O | O | O | O | O | O | X | O |
| 7' | O | O | O | O | O | O | O | O | O | O | X | O |
| 8' | O | O | O | O | O | O | O | O | O | O | X | O |
| 9' | O | O | O | O | O | O | O | O | O | O | X | O |
| 10' | O | O | O | O | O | O | O | O | O | O | X | O |
| 11' | O | O | O | O | O | O | O | O | O | O | X | O |

EXAMPLE 7

Two coat-one bake coating system:

A clear coating composition was prepared in the same manner as in Example 5 but adjusting the mixing weight proportion of the components (C) and (D) as shown in Table 6. A test piece was prepared in the same manner as in Example 3 but using the clear coating composition as prepared above and subjected to test for promoted weather resistance. The results are shown in Table 7.

TABLE 6

| Run No. | Mixing weight proportion (in terms of solid components) | |
|---|---|---|
| | Component (C) | Component (D) |
| 26 | 0.5 | 0.2 |
| 27 | 2 | 0.2 |
| 28 | 0.5 | 0.01 |
| 29 | 0.5 | 5 |
| 30 | — | 0.2 |
| 31 | 7 | 0.2 |

TABLE 7

| Run No. | 4th cycle | | | 5th cycle | | | 6th cycle | | |
|---|---|---|---|---|---|---|---|---|---|
| | Crack | Peeling | Luster | Crack | Peeling | Luster | Crack | Peeling | Luster |
| 26 | O | O | O | O | O | O | O | O | O |
| 27 | O | O | O | O | O | O | O | O | O |
| 28 | O | O | O | X | O | O | | | |
| 29 | O | X | X | | | | | | |
| 30 | O | O | O | O | X | | | | |
| 31 | O | X | X | | | | | | |

EXAMPLE 8

Preparation of a base coating composition:

Component (A'):

Into a 2 liter volume flask equipped with a reflux cooler, a dropping funnel, a thermometer and an agitator, xylene (320 g), n-butanol (80 g), methyl methacrylate (280 g), ethyl acrylate (384 g), 2-hydroxyethyl methacrylate (128 g) and methacrylic acid (8 g) were charged, and the mixture was heated up to 110° C. A mixture of xylene (320 g), n-butanol (80 g), azobisisobutyronitrile (8 g) and laurylmercaptan (2 g) was dropwise added thereto in 3 hours. After the dropwise addition was completed, the resultant mixture was agitated at about 110° C. for 2 hours to obtain a resinous composition having a solid content of 50%.

In the same manner as above but adopting the monomeric composition as shown in Table 8, there was prepared a resinous composition as the component (A').

TABLE 8

| Run No. | Monomers (part(s)) | | | | | | | | Resin characteristics | | | |
|---|---|---|---|---|---|---|---|---|---|---|---|---|
| | ST | MMA | nBMA | EA | LMA | nBA | HEMA | MAA | OH value | Acid value | Tg (°C.) | sp |
| 32 | — | 35 | — | 48 | — | — | 16 | 1 | 69 | 7 | 24 | 11.2 |
| 33 | 15 | 21.5 | — | 47 | — | — | 15 | 1.5 | 65 | 10 | 26 | 10.9 |
| 34 | — | 40 | 31 | — | — | 8 | 18 | 3 | 78 | 20 | 50 | 11.0 |
| 35 | — | 60 | — | — | 28 | — | 11 | 1 | 47 | 7 | 30 | 10.3 |
| 36 | — | 34 | — | 37.5 | — | — | 25 | 3.5 | 108 | 23 | 35 | 11.7 |
| 37 | — | 25 | — | 58 | — | — | 16 | 1 | 69 | 7 | 13 | 11.1 |
| 38 | 10 | 20 | — | 50 | — | — | 15 | 5 | 65 | 33 | 24 | 11.4 |
| 39 | — | 50 | — | — | — | 40 | 8 | 2 | 35 | 13 | 18 | 10.7 |
| 40 | 10 | 50 | — | 20 | — | — | 18 | 2 | 78 | 13 | 62 | 11.2 |
| 41 | — | 55 | — | — | — | 29 | 15.5 | 0.5 | 67 | 3 | 34 | 10.9 |
| 42 | 30 | 23.7 | — | — | 29.8 | — | 15 | 1 | 65 | 7 | 25 | 9.8 |

In the above table, the abbreviations have the following meanings: EA, ethyl acrylate; LMA, lauryl methacrylate.

Also, the test piece was subjected to test for promoted weather resistance as in Example 3. The results are shown in Table 9.

TABLE 9

| Run No. | Coating composition Base coating composition Run No. | Clear top coating composition Run No. | Finishing appearance | 2nd cycle Crack | 2nd cycle Peeling | 2nd cycle Luster | 3rd cycle Crack | 3rd cycle Peeling | 3rd cycle Luster | 4th cycle Crack | 4th cycle Peeling | 4th cycle Luster | 5th cycle Crack | 5th cycle Peeling | 5th cycle Luster |
|---|---|---|---|---|---|---|---|---|---|---|---|---|---|---|---|
| 43 | 32 | 1 | O | O | O | O | O | O | O | O | O | O | X | O | X |
| 44 | 33 | 1 | O | O | O | O | O | O | O | O | O | O | X | O | X |
| 45 | 34 | 1 | O | O | O | O | O | O | O | O | O | O | X | X | X |
| 46 | 35 | 1 | O | O | O | O | O | O | O | O | O | O | X | X | O |
| 47 | 36 | 1 | O | O | O | O | O | X | X | | | | | | |
| 48 | 37 | 1 | O | O | O | O | O | O | X | | | | | | |
| 49 | 38 | 1 | O | O | O | O | O | X | O | | | | | | |
| 50 | 39 | 1 | O | O | O | O | O | X | O | | | | | | |
| 51 | 40 | 1 | O | O | O | O | O | O | O | X | X | O | | | |
| 52 | 41 | 1 | O | O | O | O | O | X | O | | | | | | |
| 53 | 42 | 32 | X | O | O | O | O | O | O | O | O | O | X | O | X |
| 54 | 32 | 2 | O | O | O | O | O | O | O | O | O | O | X | O | O |
| 55 | 32 | 3 | O | O | O | O | O | O | O | O | O | O | X | X | O |
| 56 | 32 | 4 | O | O | O | O | O | O | O | O | O | O | X | X | O |
| 57 | 32 | 5 | O | O | O | O | O | O | O | O | O | O | X | O | O |
| 58 | 32 | 6 | O | O | O | O | O | O | O | O | O | O | O | O | X |
| 59 | 32 | 7 | O | O | O | O | O | O | O | O | O | O | O | O | X |
| 60 | 32 | 8 | O | O | O | O | O | O | O | O | O | O | O | O | X |
| 61 | 32 | 9 | O | O | O | O | O | O | O | O | O | O | X | O | X |
| 62 | 32 | 10 | O | O | O | O | O | O | O | O | O | O | O | X | X |
| 63 | 32 | 11 | O | O | O | O | O | O | O | O | O | O | O | X | X |
| 64 | 32 | 42 | O | O | O | O | X | X | X | | | | | | |
| 65 | 32 | 12 | O | O | O | O | O | X | X | | | | | | |
| 66 | 32 | 13 | O | O | O | O | O | X | O | | | | | | |
| 67 | 32 | 14 | O | O | O | O | O | X | O | | | | | | |
| 68 | 32 | 15 | O | O | O | O | O | X | X | | | | | | |
| 69 | 32 | 16 | O | O | O | O | O | X | X | | | | | | |
| 70 | 32 | 17 | O | O | O | O | O | O | X | | | | | | |
| 71 | 32 | 18 | O | O | O | O | O | O | X | | | | | | |
| 72 | 32 | 19 | O | O | O | O | X | X | O | | | | | | |
| 73 | 32 | 20 | O | X | X | O | | | | | | | | | |

Component (B'):
n-Butoxylated methylolmelamine ("Uban 20SE60" manufactured by Mitsui Toatsu Co., Ltd.).

The component (A') (140 parts), the component (B') (50 parts), an aluminum pigment ("Alpaste No. 1123N" manufactured by Toyo Aluminum Co., Ltd.) (22 parts) and xylene (30 parts) were mixed together and diluted with a mixture of toluene, isobutanol and ethylene glycol monoethyl acetate in a weight proportion of 60:20:20 to make a base coating composition showing a value of 13 seconds (20° C.) with No. 4 Ford Cup.

EXAMPLE 9

Two coat-one bake coating system:
In the same manner as in Example 3 but using the base coating composition prepared in Example 8 and the clear coating composition prepared in Example 2, two coat-one bake coating was carried out to make a test piece.

The finishing appearance of the test piece was observed, and the results are shown in Table 9 wherein the case giving 90 or more in 60° gloss was indicated as O and the case giving less than 90 was indicated as X.

EXAMPLE 10

Two coat-one bake coating system:
In the same manner as in Example 9 but using the base coating composition (Run No. 32) as the component (A') and the clear coating composition (Run No. 1) as the component (A") in the weight proportion as shown in Table 10, there was prepared a test piece.

The finishing appearance of the test piece was observed. Also, the test piece was subjected to test for promoted weather resistance. The results are shown in Table 11.

TABLE 10

| Run No. | Base coating composition Weight proportion (in terms of solid components) (part(s)) Component (A') | Base coating composition Weight proportion (in terms of solid components) (part(s)) Component (B') | Clear coating composition Weight proportion (in terms of solid components) (part(s)) Component (A") | Clear coating composition Weight proportion (in terms of solid components) (part(s)) Component (B') |
|---|---|---|---|---|
| 74 | 70 | 30 | 70 | 30 |
| 75 | 80 | 20 | 80 | 20 |
| 76 | 80 | 20 | 60 | 40 |
| 77 | 90 | 10 | 70 | 30 |
| 78 | 55 | 45 | 70 | 30 |
| 79 | 80 | 20 | 90 | 10 |
| 80 | 80 | 20 | 50 | 50 |

TABLE 11

| Run No. | Finishing appearance | 2nd cycle | | | 3rd cycle | | | 4th cycle | | | 5th cycle | | |
|---|---|---|---|---|---|---|---|---|---|---|---|---|---|
| | | Crack | Peeling | Luster | Crack | Peeling | Luster | Crack | Peeling | Luster | Crack | Peeling | Luster |
| 74 | O | O | O | O | O | O | O | O | O | O | X | O | O |
| 75 | O | O | O | O | O | O | O | O | O | O | X | X | X |
| 76 | O | O | O | O | O | O | O | O | O | O | X | X | X |
| 77 | O | O | X | O | | | | | | | | | |
| 78 | X | O | O | O | O | X | O | | | | | | |
| 79 | O | O | O | X | | | | | | | | | |
| 80 | O | O | O | O | X | X | X | | | | | | |

What is claimed is:

1. A coating composition which consists essentially of (A') a vinylic monomer-copolymerized resin having hydroxyl groups and carboxyl groups prepared by polymerizing (1) an ethylenically unsaturated monomer having a hydroxyl group, (2) an ethylenically unsaturated monomer having a carboxyl group and (3) at least one other ethylenically unsaturated monomer copolymerizable therewith; the monomer (1) being used in an amount which can provide the thus produced solid resin with a hydroxyl value of 40 to 80 and the monomer (2) being used in an amount which can provide the produced solid resin with an acid value of 5 to 25, and having a glass transition temperature of 20 to 50° C. and a solubility parameter of 10.3 to 11.5, and (B') an alkoxylated melamine-formaldehyde condensate, the weight proportion of the components (A') and (B') being from 85:15 to 60:40.

2. The coating composition according to claim 1, which further comprises (C) a compound comprising no reactive group, having a number average molecular weight of 300 to 5,000 and being in a non-crystalline state at room temperature and (D) a piperidine compound of the formula:

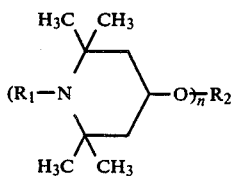

wherein n is an integer of 1 to 3, $R_1$ is hydrogen or alkyl and $R_2$ is monoacyl, N-substituted carbamoyl, N-substituted thiocarbamoyl, a monovalent group derived from an oxygen acid excluding one hydroxyl therefrom, alkyl, cycloalkyl, aralkyl or aryl when n is 1, diacyl, dicarbamoyl, bisthiocarbamoyl, carbonyl, a divalent group derived from an oxygen acid excluding two hydroxyls therefrom, alkylene, arylene or arylenedialkyl when n is 2 or triacyl, tricarbamoyl, tristhiocarbamoyl, a trivalent group derived from an oxygen acid excluding three hydroxyls therefrom, alkanetriyl, arenetriyl or arenetriylalkylene.

3. The coating composition according to claim 2 wherein the amounts of the compounds (C) and (D) are from 0.1 to 5 parts by weight and 0.05 to 3 parts by weight respectively based on 100 parts by weight of the components (A') and (B').

4. The coating composition according to claim 1, which further comprises an ultraviolet ray absorber.

5. The coating composition according to claim 1, which further comprises a metal powder.

6. A coating composition which consists essentially of (A") a vinylic monomer-copolymerized resin having hydroxyl groups and carboxyl groups prepared by polymerizing (1) an ethylenically unsaturated monomer having a hydroxyl group, (2) an ethylenically unsaturated monomer having a carboxyl group, (3) at least one other copolymerizable ethylenically unsaturated monomer as an optical monomer; and (4) at least one of aromatic vinyl monomers and alkyl acrylates or methacrylates wherein the alkyl moeity has not less than 8 carbon atoms; the monomer (4) being used in an amount of from 40 to 80% by weight based on the total weight of the monomers (1), (2), (3) and (4); the monomer (1) being used in an amount which can provide the produced solid resin with a hydroxyl value of 50 to 90; the monomer (2) being used in an amount which can provide the produced solid resin with an acid value of 5 to 25 and the monomer (3) when present being used in an amount of not more than 50% by weight based on the total weight of the monomers (1), (2), (3) and (4), said resin having a glass transition temperature of 10 to 45° C., and (B') an alkoxylated melamine-formaldehyde condensate; the weight proportion of the components (A") and (B') being from 80:20 to 60:40.

7. The coating composition according to claim 6, which further comprises (C) a compound comprising no reactive group, having a number average molecular weight of 300 to 5,000 and being in a non-crystalline state at room temperature and (D) a piperidine compound of the formula:

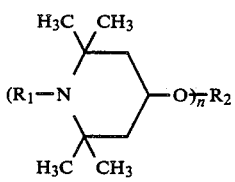

wherein n is an integer of 1 to 3, $R_1$ is hydrogen or alkyl and $R_2$ is monoacyl, N-substituted carbamoyl, N-substituted thiocarbamoyl, a monovalent group derived from an oxygen acid excluding one hydroxyl therefrom, alkyl, cycloalkyl, aralkyl or aryl when n is 1, diacyl, dicarbamoyl, bisthiocarbamoyl, carbonyl, a divalent group derived from an oxygen acid excluding two hydroxyls therefrom, alkylene, arylene or arylenedialkyl when n is 2 or triacyl, tricarbamoyl, tristhiocarbamoyl, a trivalent group derived from an oxygen acid excluding three hydroxyls therefrom, alkanetriyl, arenetriyl or arenetriylalkylene.

8. The coating composition according to claim 7 wherein the amounts of the compounds (C) and (D) are from 0.1 to 5 parts by weight and 0.05 to 3 parts by weight respectively based on 100 parts by weight of the components (A") and (B').

9. The coating composition according to claim 6, which further comprises an ultraviolet ray absorber.

10. A two coat-one bake coating system wherein the coating composition according to claim 1 is used as a base coating composition.

11. A two coat-one bake coating system wherein the coating composition according to claim 6 is used as a clear coating composition.

12. A two coat composition applied to at least one surface of a substrate wherein the base coating is a composition consisting essentially of (A') a vinylic monomer-copolymerized resin having hydroxyl groups and carboxyl groups prepared by polymerizing (1) an ethylenically unsaturated monomer having a hydroxyl group, (2) an ethylenically unsaturated monomer having a carboxyl group and (3) at least one other ethylenically unsaturated monomer copolymerizable therewith; the monomer (1) being used in an amount which can provide the thus produced solid resin with a hydroxyl value of 40 to 80 and the monomer (2) being used in an amount which can provide the produced solid resin with an acid value of 5 to 25, and having a glass transition temperature of 20 to 50° C. and a solubility parameter of 10.3 to 11.5, and (B') an alkoxylated melamine-formaldehyde condensate, the weight proportion of the components (A') and (B') being from 85:15 to 60:40; and a clear coating consisting essentially of (A'') a vinylic monomer copolymerized resin having hydroxyl groups and carboxyl groups prepared by polymerizing (1) an ethylenically unsaturated monomer having a hydroxyl group, (2) an ethylenically unsaturated monomer having a carboxyl group, (3) at least one other copolymerizable ethylenically unsaturated monomer as an optional monomer; and (4) at least one of aromatic vinyl monomers and alkyl acrylates or methacrylates wherein the alkyl moiety has not less than 8 carbon atoms; the monomer (4) being used in an amount of from 40 to 80% by weight based on the total weight of the monomers (1), (2), (3) and (4); the monomer (1) being used in an amount which can provide the produced solid resin with a hydroxyl value of 50 to 90; the monomer (2) being used in an amount which can provide the produced solid resin with an acid value of 5 to 25 and the monomer (3) when present being used in an amount of not more than 50% by weight based on the total weight of the monomers (1), (2), (3), (4), said resin having a glass transition temperature of 10° to 45° C., and (B') an alkoxylated melamine-formaldehyde condensate; the weight proportion of the components (A'') and (B') being from 80:20 to 60:40.

13. A method for coating a substrate with two coatings which comprises applying to at least one surface of a substrate a first coating composition, optionally diluted with a solvent, said composition consisting essentially of (A') a vinylic monomer-copolymerized resin having hydroxyl groups and carboxyl groups prepared by polymerizing (1) an ethylenically unsaturated monomer having a hydroxyl group, (2) an ethylenically unsaturated monomer having a carboxyl group and (3) at least one other ethylenically unsaturated monomer copolymerizable therewith; the monomer (1) being used in an amount which can provide the thus produced solid resin with a hydroxyl value of 40 to 80 and the monomer (2) being used in an amount which can provide the produced solid resin with an acid value of 5 to 25, and having a glass transition temperature of 20° to 50° C. and a solubility parameter of 10.3 to 11.5, and (B') an alkoxylated melamine-formaldehyde condensate, the weight proportion of the components (A') and (B') being from 85:15 to 60:40; and then applying a second coating composition, optionally diluted with a solvent, onto the first coating, said second coating composition consisting essentially of (A'') a vinylic monomer-copolymerized resin having hydroxyl groups and carboxyl groups prepared by polymerizing (1) an ethylenically unsaturated monomer having a hydroxyl group, (2) an ethylenically unsaturated monomer having a carboxyl group, (3) at least one other copolymerizable ethylenically unsaturated monomer as an optional monomer; and (4) at least one of aromatic vinyl monomers and alkyl acrylates or methacrylates wherein the alkyl moiety has not less than 8 carbon atoms; the monomer (4) being used in an amount of from 40 to 80% by weight based on the total weight of the monomers (1), (2), (3) and (4); the monomer (1) being used in an amount which can provide the produced solid resin with a hydroxyl value of 50 to 90; the monomer (2) being used in an amount which can provide the produced solid resin with an acid value of 5 to 25 and the monomer (3) when present being used in an amount of not more than 50% by weight based on the total weight of the monomers (1), (2), (3), (4), said resin having a glass transition temperature of 10° to 45° C., and (B') an alkoxylated melamine-formaldehyde condensate; the weight proportion of the components (A'') and (B') being from 80:20 to 60:40; and then baking the resulting coating compositions on the substrate.

14. A base coating composition for a two coat-one bake coating system which comprises (A) a vinylic monomer-copolymerized resin containing a hydroxyl group and a carboxyl group and having a glass transition temperature of 20° to 50° C. and a solubility parameter of 10.3 to 11.5, the resin (A) being one prepared by polymerizing (1) an ethylenically unsaturated monomer having a hydroxyl group, (2) an ethylenically unsaturated monomer having a carboxyl group and (3) at least one other ethylenically unsaturated monomer copolymerizable therewith, the monomer (1) being used in an amount which can provide the produced solid resin with a hydroxyl value of 40 to 80, the monomer (2) being used in an amount which can provide the produced solid resin with an acid value of 5 to 25 and the monomer (3) comprising an alkyl methacrylate, and (B) an alkoxylated melamineformaldehyde condensate, the weight proportion of the component (A) and the component (B) being from 85:15 to 60:40.

15. The composition according to claim 14, wherein the monomer (3) comprises at least one alkyl methacrylate and at least one other ethylenically unsaturated monomer.

16. A clear coating composition for a two coat-one bake coating system which comprises (A) a vinylic monomer-copolymerized resin containing a hydroxyl group and a carboxyl group and having a glass transition temperature of 10° to 45° C., the resin (A) being the one prepared by polymerizing (1) an ethylenically unsaturated monomer having a hydroxyl group, (2) an ethylenically unsaturated monomer having a carboxyl group and (3) at least one ethylenically unsaturated monomer copolymerizable therewith, the monomer (1) being used in an amount which can provide the produced solid resin with a hydroxyl value of 50 to 90, the monomer (2) being used in an amount which can provide the produced solid resin with an acid value of 5 to 25 and the monomer (3) comprising styrene, and (B) an alkoxylated melamineformaldehyde condensate, the weight proportion of the component (A) and the component (B) being from 80:20 to 60:40.

17. The composition according to claim 16, wherein the monomer (3) comprises styrene and at least one other ethylenically unsaturated monomer.

18. The composition according to claim 16, wherein the amount of styrene is from 40 to 80% by weight based on the total weights of the monomers (1), (2) and (3).

19. The composition according to claim 17, wherein the amount of styrene is from 40 to 80% by weight based on the total weights of the monomers (1), (2) and (3).

* * * * *